United States Patent
Nam

(10) Patent No.: US 9,726,073 B2
(45) Date of Patent: Aug. 8, 2017

(54) ENGINE SYSTEM FOR CONTROLLING FLOW OF EXHAUST GAS

(71) Applicant: Hyundai Motor Company, Seoul (KR)

(72) Inventor: Kihoon Nam, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/798,168

(22) Filed: Jul. 13, 2015

(65) Prior Publication Data
US 2016/0123221 A1 May 5, 2016

(30) Foreign Application Priority Data
Oct. 29, 2014 (KR) .................. 10-2014-0148304

(51) Int. Cl.
| | |
|---|---|
| *F01N 5/04* | (2006.01) |
| *F02B 37/16* | (2006.01) |
| *F01N 3/021* | (2006.01) |
| *F02M 26/06* | (2016.01) |
| *F02M 26/23* | (2016.01) |
| *F02M 26/38* | (2016.01) |

(Continued)

(52) U.S. Cl.
CPC ............ *F02B 37/168* (2013.01); *F01N 3/021* (2013.01); *F02M 26/06* (2016.02); *F02M 26/23* (2016.02); *F02M 26/38* (2016.02); *F02M 26/42* (2016.02); *F02D 41/123* (2013.01); *F02M 26/15* (2016.02); *F05B 2220/40* (2013.01)

(58) Field of Classification Search
CPC ....... F01N 3/2066; F01N 3/021; F02M 26/06; F02M 26/23; F02M 26/38; F02M 26/42
USPC .......................................................... 60/280
See application file for complete search history.

(56) References Cited

U.S. PATENT DOCUMENTS

| | | |
|---|---|---|
| 6,931,836 B2 | 8/2005 | Steinert |
| 2007/0272480 A1 | 11/2007 | Kuroda et al. |

(Continued)

FOREIGN PATENT DOCUMENTS

| | | |
|---|---|---|
| JP | 5-44449 A | 2/1993 |
| JP | 2011-214546 A | 10/2011 |

(Continued)

OTHER PUBLICATIONS

English translation of Japanese Patent Application Publication No. JP 2011-214546 A, Oct. 27, 2011.

*Primary Examiner* — Jason Shanske
(74) *Attorney, Agent, or Firm* — Morgan Lewis & Bockius LLP

(57) ABSTRACT

An engine system for controlling flow of exhaust gas may include an intake line to receive external air, an engine including a combustion chamber to combust the external air and a fuel supplied through the intake line, to generate driving torque, an exhaust line to exhaust the exhaust gas combusted in the combustion chamber of the engine, a turbocharger including a turbine operated according to exhaust gas flowing through the exhaust line and a compressor to compress the external air flowing through the intake line, a catalyst device to reduce a harmful component included in the exhaust gas passing through the turbine of the turbocharger, a bypass line branched from the exhaust line between the combustion chamber and the turbine and converged in the intake line between the compressor and the combustion chamber, and a bypass valve disposed in the bypass line to selectively open/close the bypass line.

4 Claims, 4 Drawing Sheets

(51) Int. Cl.
*F02M 26/42* (2016.01)
*F02M 26/15* (2016.01)
*F02D 41/12* (2006.01)

(56) References Cited

U.S. PATENT DOCUMENTS

| | | | | |
|---|---|---|---|---|
| 2010/0180590 A1* | 7/2010 | Andreae | ............... | F02B 37/013 60/600 |
| 2010/0263372 A1* | 10/2010 | Pagot | ........................ | F01N 3/10 60/602 |
| 2010/0293943 A1* | 11/2010 | Teng | ........................ | F02B 37/00 60/602 |
| 2012/0312001 A1* | 12/2012 | Nam | .................... | F02D 41/221 60/299 |
| 2013/0145831 A1* | 6/2013 | Nam | .................... | F02D 41/0077 73/114.74 |
| 2013/0333665 A1* | 12/2013 | Pursifull | ................. | F02B 37/04 123/399 |
| 2013/0340427 A1* | 12/2013 | Gonzalez Delgado | ... | F02D 9/04 60/605.2 |
| 2014/0123968 A1* | 5/2014 | Farman | .................... | F02B 37/18 123/676 |

FOREIGN PATENT DOCUMENTS

| | | |
|---|---|---|
| KR | 10-2003-0086358 A | 11/2003 |
| KR | 10-0802722 B1 | 2/2008 |

\* cited by examiner

ENGINE SYSTEM FOR CONTROLLING FLOW OF EXHAUST GAS

CROSS-REFERENCE TO RELATED APPLICATION

The present application claims priority to Korean Patent Application No. 10-2014-0148304 filed Oct. 29, 2014, the entire contents of which is incorporated herein for all purposes by this reference.

BACKGROUND OF THE INVENTION

Field of the Invention

The present invention relates to an engine system for controlling flow of exhaust gas. More particularly, the present invention relates to an engine system for controlling flow of exhaust gas capable of stably maintaining a cleaning rate of exhaust gas by stably maintaining a temperature of a diesel oxidation catalyst (DOC) or a diesel particulate filter (DPF) in an overrun condition of an engine.

Description of Related Art

In recent years, in order to respond to limitations on exhaust gas in a passenger diesel engine, a diesel oxidation catalyst (DOC), a diesel particulate filter (DPF), a nitrogen oxide cleaning unit (LNT, lean NOx trap), a selective catalytic reduction (SCR) unit, and the like have been considered.

A post processing system such as the DOC, the LNT, and the SCR mounted for the purpose of reducing exhaust gas requires a basic temperature for chemical reaction.

In general, exhaust temperature is low in an engine cool state (coolant temperature of 90° C. or less). In this region, exhaust gas is excessively exhausted after the post processing device is activated.

Accordingly, cool exhaust gas reduction has been performed by applying an exhaust temperature increasing strategy through fuel consumption sacrifice in a cool region.

However, the exhaust temperature increase is possible through combustion strategy. However, in a case of overrun (coasting run, non-combustion state), intake air is discharged to an engine exhaust port without a combustion process which cools the post-processing system so that the temperature of the post-processing system is reduced and an activation temperature reach time may be delayed.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing an engine system for controlling flow of exhaust gas having advantages of improving quality of exhaust gas by preventing a temperature of a catalyst unit from being reduced when non-combustion exhaust gas passes through the catalyst unit like in an overrun condition.

According to various aspects of the present invention, an engine system for controlling flow of exhaust gas may include an intake line to receive external air, an engine including a combustion chamber to combust the external air and a fuel supplied through the intake line, to generate driving torque, an exhaust line to exhaust the exhaust gas combusted in the combustion chamber of the engine, a turbocharger including a turbine operated according to exhaust gas flowing through the exhaust line and a compressor to compress the external air flowing through the intake line, a catalyst device to reduce a harmful component included in the exhaust gas passing through the turbine of the turbocharger, a bypass line branched from the exhaust line between the combustion chamber and the turbine and converged in the intake line between the compressor and the combustion chamber, and a bypass valve disposed in the bypass line to selectively open/close the bypass line.

The engine system may further include a controller configured to open the bypass valve to control the exhaust gas to bypass the turbocharger and the catalyst device when the fuel is not injected at the engine and rotational speed of the engine is equal to or greater than a preset value.

The controller may be configured to control the bypass valve based on an accelerator pedal signal, a coolant temperature of the engine, vehicle speed, and a signal of a lambda sensor disposed between the turbocharger and the engine.

The engine system may, further include a high pressure EGR line branched from the exhaust line between the turbocharger and the engine to recirculate the exhaust gas to the intake line, a high pressure EGR cooler disposed in the high pressure EGR line to cool the recirculated exhaust gas, and a high pressure EGR valve installed in the high pressure EGR line to control the recirculated exhaust gas.

The catalyst device includes a diesel oxidation catalyst (DOC) including an oxide catalyst, and a diesel particulate filter (DPF) to filter a particulate matter.

According to various aspects of the present invention, a method for controlling flow of exhaust gas, may include detecting, by an controller, a running condition of a vehicle, determining, by the controller, a running state of the vehicle based on the running condition, and controlling, by the controller, a bypass valve installed at a line bypassing a catalyst device based on the running state to control the exhaust gas bypassing the catalyst device.

The running condition may include at least one of vehicle speed, rotational speed of an engine, an injection amount of a fuel, an accelerator pedal signal, a coolant temperature, or a lambda value of the exhaust gas.

The controller may block the bypass valve so that the exhaust gas passes through the catalyst device regardless of the running state when the coolant temperature is equal to or greater than a preset temperature.

The controller may block the bypass valve so that the exhaust gas passes through the catalyst device when the running state is an idle state.

The controller may block the bypass valve so that the exhaust gas passes through the catalyst device when the running state is an acceleration state.

The controller may block the bypass valve so that the exhaust gas bypasses the catalyst device when the running state is an overrun state, and the lambda value is equal to or greater than a preset value.

The controller may block the bypass valve so that the exhaust gas passes through the catalyst device when the running state is an overrun state, and the lambda value is less than a preset value.

In accordance with the engine system for controlling flow of exhaust gas according to various embodiments of the present invention as described above, the temperature of the catalyst unit may be stably maintained and the quality of the exhaust gas may be improved by controlling non-combustion exhaust gas of the engine to bypass the catalyst unit in an overrun condition.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
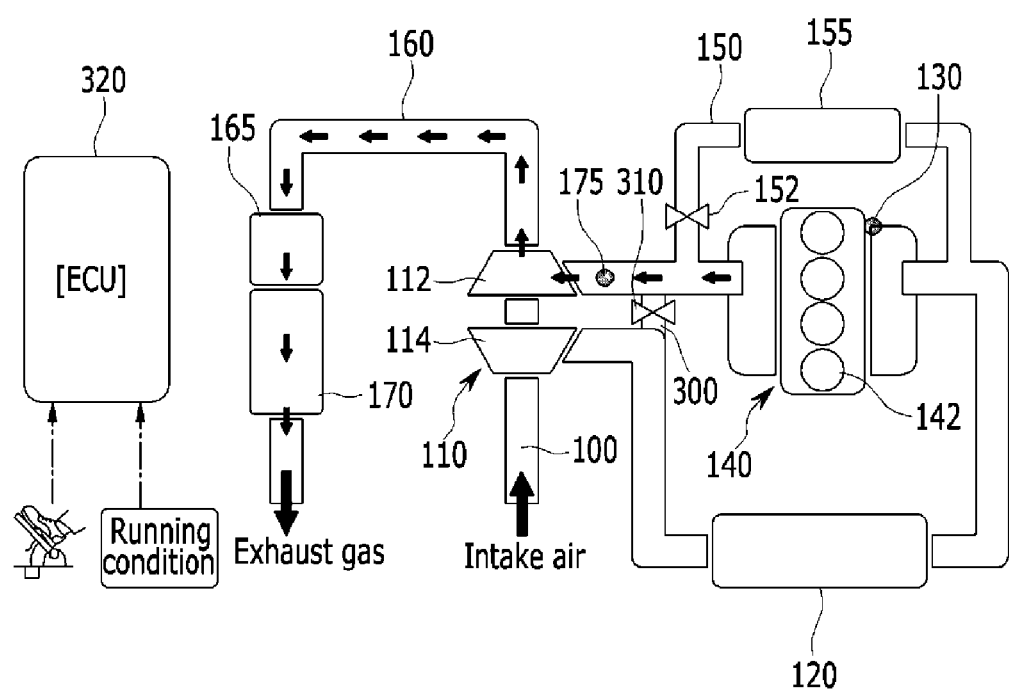
FIG. 1A and FIG. 1B are schematic diagrams illustrating an exemplary engine system for controlling flow of exhaust gas according to the present invention.
Figure 1B:
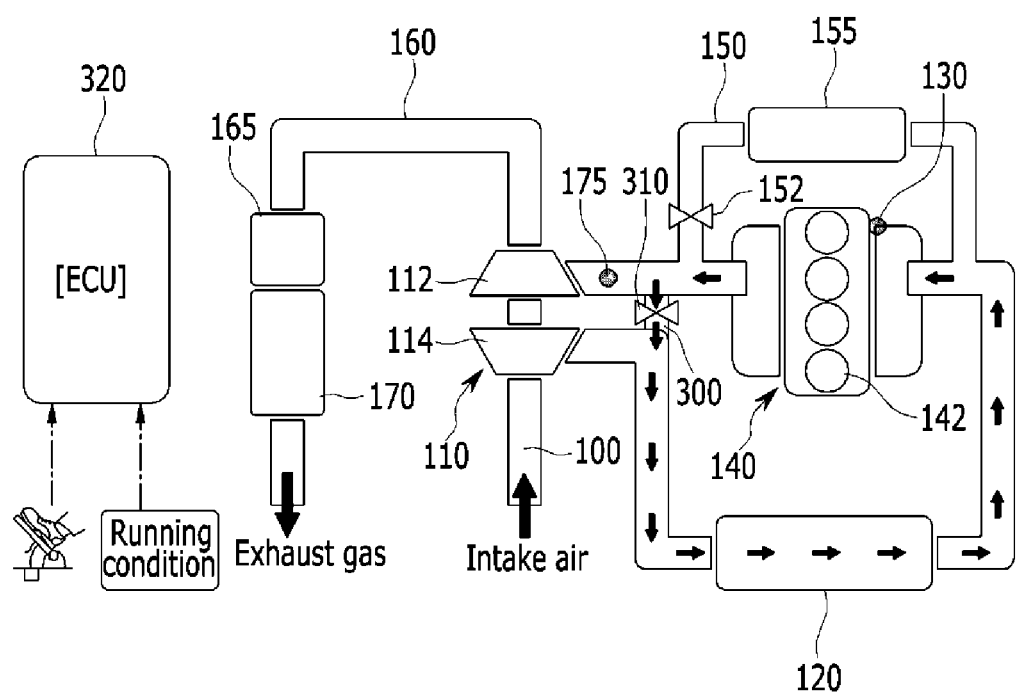

FIG. 1A and FIG. 1B are schematic diagrams illustrating an engine system for controlling flow of exhaust gas according to various embodiments of the present invention.

FIG. 1A shows a state where a bypass valve is closed, and FIG. 1B shows a state where the bypass valve is opened.

As shown in FIG. 1A and FIG. 1B, the engine system includes an intake line 100, a turbocharger 110, an intercooler 120, an engine 140, a coolant temperature sensor 130, an exhaust line 160, a diesel oxidation catalyst 165, a diesel particulate filter 170, a high pressure EGR line 150, and a high pressure EGR cooler 155.

External air is supplied to the intake line 100.

Further, the turbocharger 110 rotates a turbine 112 according to exhaust gas flowing through the exhaust line 160, and the turbine 112 compresses external air flowing through the intake line to supply the compressed external air into a combustion chamber 142 of the engine 140.

The external air supplied through the intake line 100 and a fuel is supplied into the combustion chamber 142, and combusted in the combustion chamber 142 to generate driving torque.

The intercooler 120 cools intake air flowing through the intake line 100, and the high EGR line 150 recirculates exhaust gas exhausted from the combustion chamber 142 of the engine 140 to the intake line 100.

The high pressure EGR line 150 is disposed therein with a high pressure EGR valve and a high pressure EGR cooler 155, and controls flow and temperature of recirculation exhaust gas.

In the exhaust line 160, a catalyst device is disposed at a downstream side of the turbocharger 110, and the catalyst device includes a diesel oxidation catalyst (DOC) 165 and a diesel particulate filter (DPF) 170.

The diesel oxidation catalyst 165 reduces harmful material included in the exhaust gas, and the diesel particulate filter 170 filters and removes particulate matter included in the exhaust gas.

A lambda sensor 175 is disposed at an upstream side of the turbocharger 110 in the exhaust line 160, and detects a concentration of oxygen included in the exhaust gas exhausted from the combustion chamber 142 of the engine 140 to output a lean/rich state signal of the exhaust gas.

The coolant temperature sensor 130 is disposed close to the engine 140 and detects a temperature signal of coolant circulating through the engine 140.

In various embodiments of the present invention, in the overrun condition, the fuel is not injected into the combustion chamber 142 of the engine 140, and the engine 140 is rotated according to torque transferred through a drive shaft.

For example, a driver removes a foot from an accelerator pedal, the injector does not inject the fuel, and the engine is rotated at a speed faster than idle rotational speed.

In this case, the overrun condition may include a coasting running state or a brake state of a vehicle.

The coasting run may include a speed reduction run or a downward path run where power is not used.

Accordingly, the external air is introduced into the engine 140 through the intake line 100, non-combustion gas at a low temperature which is not combusted flows through the exhaust line 160, a temperature of the diesel oxidation catalyst 165 and a temperature of the diesel particulate filter 170 may be rapidly reduced, and cleaning characteristics of the diesel oxidation catalyst 165 and the diesel particulate filter 170 may be deteriorated.

Figure 2:
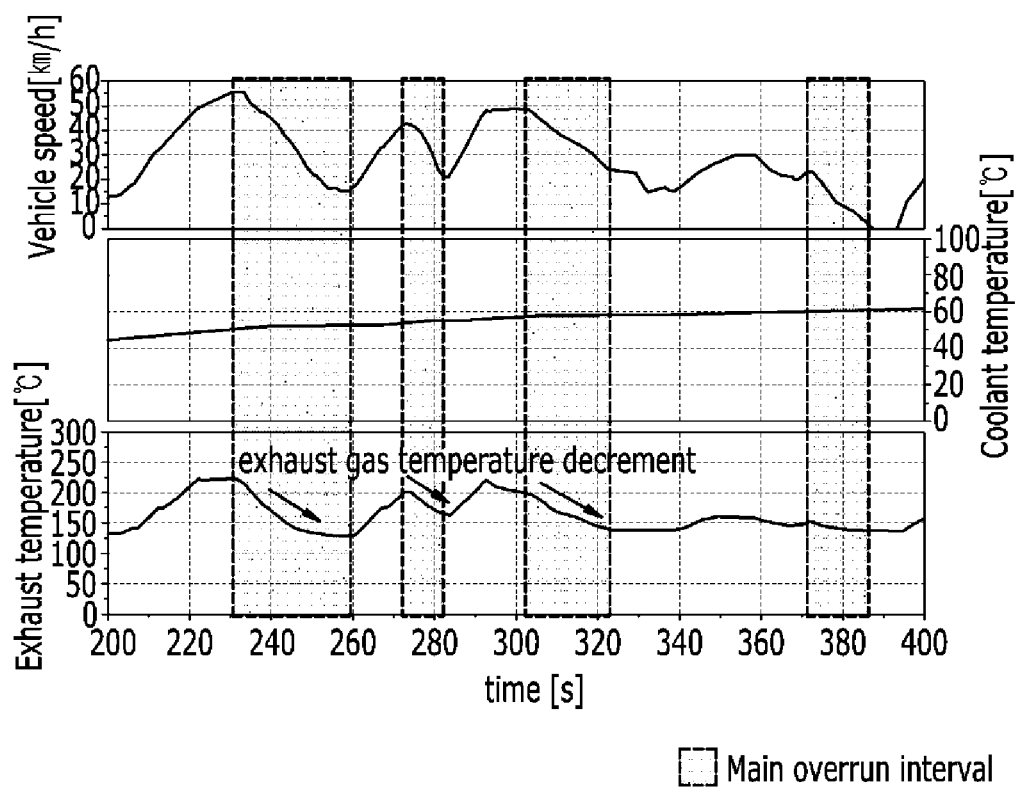
FIG. 2 is a graph illustrating an overrun interval in the exemplary engine system for controlling flow of exhaust gas according to the present invention.

FIG. 2 is a graph illustrating an overrun interval in an engine system for controlling flow of exhaust gas according to various embodiments of the present invention.

Referring to FIG. 2, a horizontal axis represents a time, and a vertical axis represents an exhaust temperature and vehicle speed.

Since the fuel is not injected in the overrun condition, the vehicle speed is reduced, an exhaust temperature is rapidly reduced, and a cleaning characteristic of the catalyst device such as the diesel oxidation catalyst 165 or the diesel particulate filter 170 is deteriorated.

Referring back to FIG. 1A and FIG. 1B, a compressor 114 of the turbocharger 110 and the intercooler 120 are sequentially disposed in the intake line 100, and a turbine 112 of the turbocharger 110, the diesel oxidation catalyst 165, and the diesel particulate filter 170 are sequentially disposed in the exhaust line 160.

The high pressure EGR line 150 is branched between the turbine 112 of the turbocharger 110 and the engine 140 and is converged between the engine 140 and the intercooler 120.

The bypass line 300 is branched from an exhaust line between the combustion chamber 142 of the engine 140 and the turbine 112 and is converged with the intake line 100 between the compressor 114 and the combustion chamber 142.

The bypass line 300 is disposed therein with a bypass valve 310 that selectively opens/closes the bypass line 300.

That is, according to opening/closing of the bypass valve 310, the exhaust gas flowing through the exhaust line 160 bypasses through the diesel oxidation catalyst 165 and the diesel particulate filter 170.

A controller 320 detects a coolant temperature from the coolant temperature sensor 130, detects a state of the exhaust gas from the lambda sensor 175, and detects a running state of the accelerator pedal and a running condition of the engine 140.

The running condition may include an injection amount of a fuel, rotational speed of the engine, vehicle speed, coolant temperature, an exhaust gas state, and a state of a transmission.

The controller 320 may include at least one processor which is operated by a preset program, and the preset program performs respective steps of the method for controlling the engine system according to various embodiments of the present invention.

If it is determined that an overrun condition is satisfied based on a state of an accelerator pedal and a running condition, the controller 320 opens the bypass valve 310 so that non-combustion exhaust gas bypasses the diesel oxidation catalyst 165 and the diesel particulate filter 170.

That is, if the overrun condition is satisfied, the controller 320 opens the bypass valve.

By the opening of the bypass valve, the exhaust gas exhausted from the combustion chamber 142 of the engine flows to a rear end of the compressor 114 from a front end of the turbine 112.

In this way, since the exhaust gas exhausted from the combustion chamber 142 is not supplied into the catalyst device through the turbine 112, a temperature of the catalyst device (i.e., diesel oxidation catalyst 165 and diesel particulate filter 170) is prevented from being reduced and a cleaning rate of the catalyst device may be stably maintained.

Further, before starting the engine, when the temperature of the catalyst device is low (i.e., coolant temperature of the engine is low), an activation time (LOT: light off time) of the catalyst device may be reduced.

Hereinafter, a method for controlling flow of exhaust gas according to various embodiments of the present invention will be described.

Figure 3:
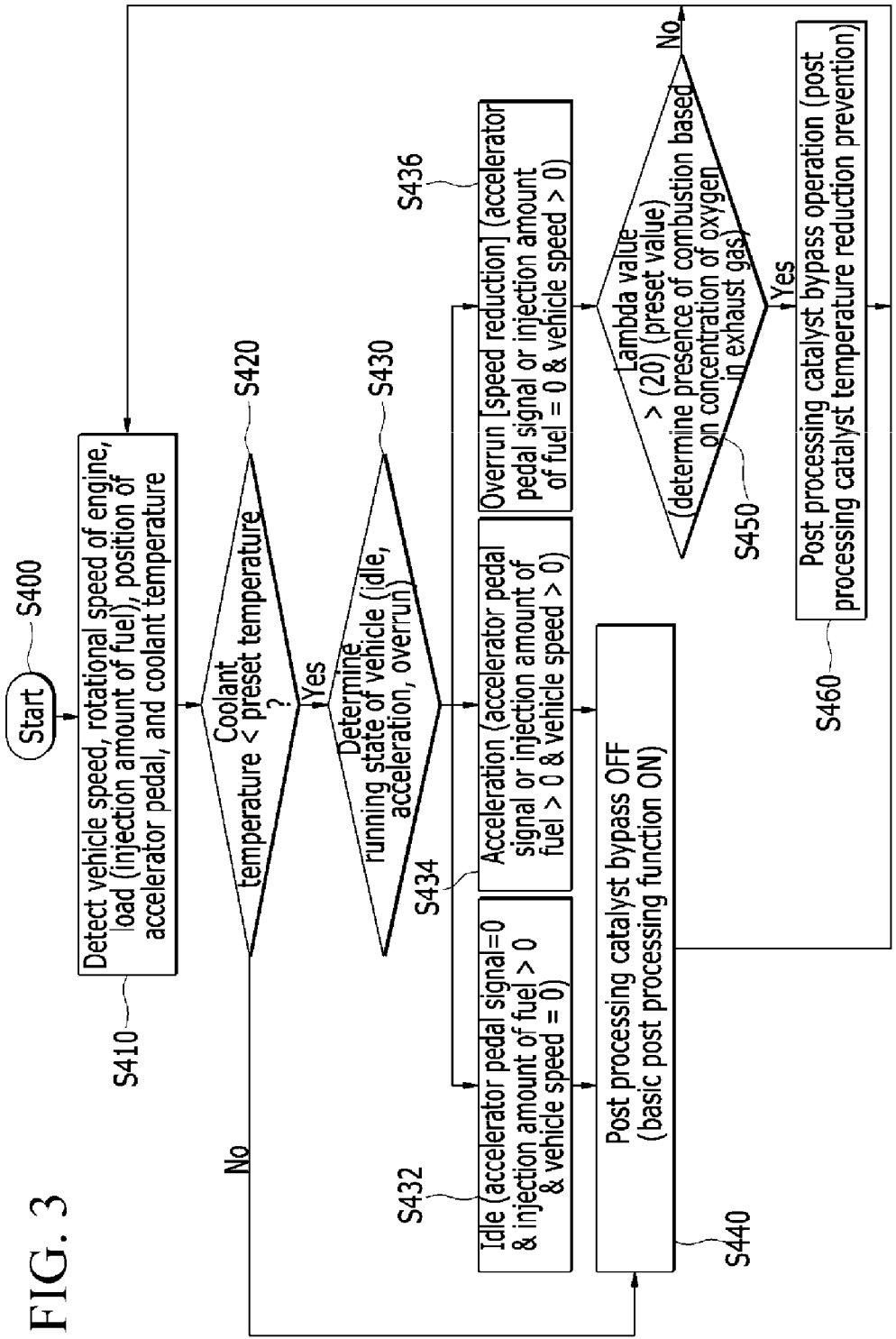
FIG. 3 is a flowchart illustrating an exemplary method for controlling flow of exhaust gas in the exemplary engine system according to the present invention.

FIG. 3 is a flowchart illustrating a method for controlling flow of exhaust gas in the engine system according to various embodiments of the present invention.

As shown in FIG. 3, the controller detects running conditions including vehicle speed, rotational speed of the engine, a load (injection amount of the fuel), a position of an accelerator pedal, and a coolant temperature (S410).

The control portion determines whether a coolant temperature of the engine detected by the coolant temperature sensor 130 is less than a preset temperature (i.e., 80° C.) (S420).

When the coolant temperature of the engine detected by the coolant temperature sensor 130 is equal to or greater than the preset temperature, the controller 320 blocks the bypass valve so that exhaust gas exhausted from the combustion chamber 142 passes through the catalyst device regardless of a running state determined based on the detected running condition (S440).

When the coolant temperature of the engine detected by the coolant temperature sensor 130 is less than the preset temperature, the controller determines a running state of the vehicle according to the running condition (S430).

The running state includes an idle state, an acceleration state, and an overrun state.

The idle state includes a case where an accelerator pedal signal is 0 and the injection amount of the fuel is greater than 0 (S432).

The acceleration state includes a case where the accelerator pedal signal is greater than 0, an injection amount of the fuel is greater than 0, and vehicle speed is greater than 0 (S434).

Further, the overrun state includes a case where the accelerator pedal signal is 0, an injection amount of the fuel is 0, and vehicle speed is greater than 0 (S436).

When the running state is the idle state, the controller 320 blocks the bypass valve so that the exhaust gas flowing through the exhaust line 160 flows through the diesel oxidation catalyst 165 and the diesel particulate filter 170 of the catalyst device (see FIG. 1A).

When the running state is the acceleration state, the controller 320 blocks the bypass valve so that the exhaust gas flowing through the exhaust line 160 flows through the diesel oxidation catalyst 165 and the diesel particulate filter 170 of the catalyst device (see FIG. 1A).

When the running state of the vehicle is the overrun state, the controller 320 determines whether a lambda value detected by the lambda sensor 175 is equal to or greater than a preset value (e.g., 20).

When the lambda value is greater than the preset value, the controller 320 opens the bypass valve 310 so that the exhaust gas flowing through the exhaust line 160 bypasses the diesel oxidation catalyst 165 and the diesel particulate filter 170 of the catalyst device (see FIG. 1B).

If the lambda value is greater than the preset value, the routine returns to step S410.

The concentration of oxygen in the exhaust gas may be determined through the lambda value, and the combustion state of the fuel in the combustion chamber 142 may be determined through the detected concentration of the oxygen.

Therefore, according to the combustion state, the bypass valve may be exactly controlled, and the temperature of the catalyst device is prevented from being deteriorated so that a cleaning rate of exhaust gas may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine system for controlling flow of exhaust gas, comprising:
   an intake line to receive external air;
   an engine including a combustion chamber to combust the external air and a fuel supplied through the intake line, to generate driving torque;
   an exhaust line to exhaust the exhaust gas combusted in the combustion chamber of the engine;
   a turbocharger including a turbine operated according to the exhaust gas flowing through the exhaust line and a compressor to compress the external air flowing through the intake line;
   a catalyst device so as to reduce a harmful component included in the exhaust gas passing through the turbine of the turbocharger;
   a bypass line branched from the exhaust line between the combustion chamber and the turbine and converged in the intake line between the compressor and the combustion chamber;
   a bypass valve disposed in the bypass line to selectively open or close the bypass line; and
   a controller configured to open the bypass valve to control the exhaust gas to bypass the turbocharger and the catalyst device when the fuel is not injected at the engine and rotational speed of the engine is equal to or greater than a preset value.

2. The engine system of claim 1, wherein the controller is configured to control the bypass valve based on an accelerator pedal signal, a coolant temperature of the engine, vehicle speed, and a signal of a lambda sensor disposed between the turbocharger and the engine.

3. The engine system of claim 1, further comprising:
   a high pressure EGR line branched from the exhaust line between the turbocharger and the engine to recirculate the exhaust gas to the intake line;
   a high pressure EGR cooler disposed in the high pressure EGR line to cool the recirculated exhaust gas; and
   a high pressure EGR valve installed in the high pressure EGR line to control the recirculated exhaust gas.

4. The engine system of claim 1, wherein the catalyst device comprises:
   a diesel oxidation catalyst (DOC) including an oxide catalyst; and
   a diesel particulate filter (DPF) to filter a particulate matter.

* * * * *